(12) United States Patent
Dow et al.

(10) Patent No.: US 7,908,956 B2
(45) Date of Patent: Mar. 22, 2011

(54) MACHINE FOR ALTERNATING TUBULAR AND FLAT BRAID SECTIONS

(75) Inventors: Richard M. Dow, Philadelphia, PA (US); Stephen J. Kryven, Langhorne, PA (US)

(73) Assignee: Triaxial Structures, Inc., Philadelphia, PA (US)

( * ) Notice: Subject to any disclaimer, the term of this patent is extended or adjusted under 35 U.S.C. 154(b) by 169 days.

(21) Appl. No.: 12/348,601

(22) Filed: Jan. 5, 2009

(65) Prior Publication Data

US 2009/0188380 A1 Jul. 30, 2009

Related U.S. Application Data

(60) Provisional application No. 61/019,964, filed on Jan. 9, 2008.

(51) Int. Cl.
  *D04C 3/24* (2006.01)
(52) U.S. Cl. .................... 87/16; 87/7; 87/41; 87/62
(58) Field of Classification Search .............. 87/7, 16, 87/41, 62
  See application file for complete search history.

(56) References Cited

U.S. PATENT DOCUMENTS

| | | | |
|---|---|---|---|
| 1,032,870 A | 7/1912 | Wardell | |
| 1,423,587 A | 7/1922 | Wardell | |
| 2,148,164 A | 3/1938 | Krippendorf | |
| 3,714,861 A | 2/1973 | Strangfeld | |
| 4,084,479 A | 4/1978 | Ratera | |
| 4,275,638 A | 6/1981 | DeYoung | |
| 4,700,054 A | 10/1987 | Triplett | |
| 4,774,871 A | 10/1988 | Jones et al. | |
| 4,943,334 A | 7/1990 | Medney et al. | |
| 5,287,790 A * | 2/1994 | Akiyama et al. | 87/9 |
| 5,361,674 A | 11/1994 | Akiyama et al. | |
| 6,360,644 B1 | 3/2002 | Bettger | |
| 6,599,561 B2 | 7/2003 | Dow et al. | |
| 6,907,810 B2 | 6/2005 | Kim | |
| 6,942,693 B2 | 9/2005 | Chouinard et al. | |
| 7,004,967 B2 | 2/2006 | Chouinard et al. | |
| 7,105,019 B2 | 9/2006 | Hojeibane | |
| 7,237,466 B2 | 7/2007 | Chen | |
| 7,270,043 B2 | 9/2007 | Presz, Jr. et al. | |
| 2002/0055313 A1 | 5/2002 | Velpari et al. | |
| 2004/0012937 A1 | 1/2004 | DeGrappo et al. | |
| 2006/0225564 A1 | 10/2006 | Presz | |
| 2007/0051232 A1 | 3/2007 | Chen | |
| 2008/0216887 A1 | 9/2008 | Hacke et al. | |

* cited by examiner

*Primary Examiner* — Shun R Hurley
(74) *Attorney, Agent, or Firm* — Duane Morris LLP; Steven E. Koffs

(57) ABSTRACT

A braider has a track for guiding 4N bobbin carriers and 4N horngears, where N is an integer greater than one. The horngears each have four horns for forming at least two paths. The bobbin carriers are positioned on the horngears in a tubular braiding mode with the track and horngears configured to provide two paths intersecting each other, to form a tubular braid section. The bobbin carriers are positioned on the horngears in a flat braiding mode, with the track and horngears configured so that there are N separate closed paths that do not intersect each other, to form a flat braid section. The braider is switched between the tubular and flat braiding modes while N of the horngears are free of contact with the bobbin carriers, to form a continuous braid having at least one tubular braid section and at least one flat braid section.

19 Claims, 16 Drawing Sheets

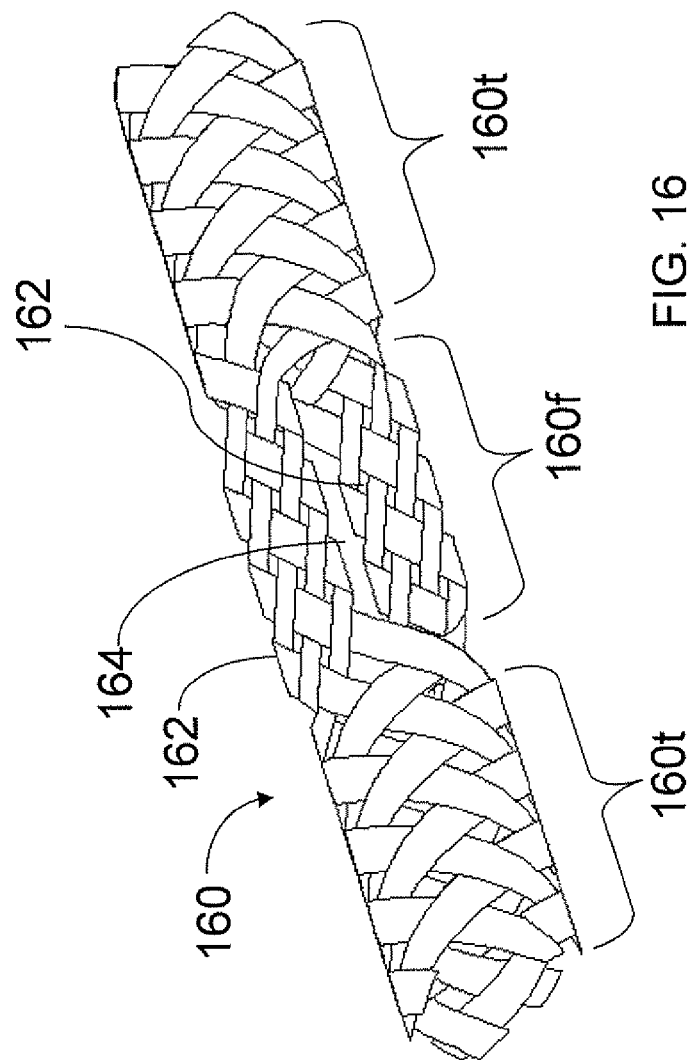

MACHINE FOR ALTERNATING TUBULAR AND FLAT BRAID SECTIONS

This application claims the benefit of U.S. Provisional Patent Application No. 61/019,694 filed Jan. 8, 2008, which is expressly incorporated by reference herein in its entirety.

FIELD OF THE INVENTION

The present invention relates to braiding, automatic splitting and rejoining of the braided material and methods.

BACKGROUND

Braided structures are configured in two main ways, tubular braids and flat braids. A conventional tubular braided structure can be accomplished using standard braiding technology that has been in existence for several centuries. The standard tubular braided structure can be braided over material (a core) or left as a hollow tube. As braiding is a highly efficient process and can be operated in clean environments, many medical devices are manufactured using this process such as stents, sutures and catheters.

A typical machine for producing a tubular braid is shown in U.S. Pat. No. 7,237,466, incorporated by reference herein in its entirety, in which FIG. 1 shows a plate 12 having a track comprising two intersecting paths, along which a plurality of carriers 15 are advanced by eight rotating horngears (transfer plates 14). Carriers 15 travel along one of the paths in a clockwise-direction, and carriers travel along the other path in the counter-clockwise direction to form the tubular braid.

Flat braids are created on braiding equipment similar to that used for tubular braids. These braided constructions are typically use in electronics for ground wiring and other high current environments. Sometimes a tubular braid is over-braided onto a flat braid as an insulator. Machines arranged for flat braiding differ from machines arranged for tubular braiding in that flat braiding arrangements cause the yarn carriers to reverse direction at the edge of the braid, instead of continuing in closed curved paths.

Over the years, variations of braiding machines have been developed to produce either a tubular braid or a flat braid, or to switch between the tubular braiding mode and flat braiding mode during operation.

U.S. Pat. No. 2,148,164 to Krippendorf, incorporated by reference herein in its entirety, describes a machine that switches between tubular and flat braiding modes, with a pair of special horngears that pass bobbin carriers back and forth in the tubular braiding mode, or reverse the direction of the bobbin carriers in the flat braiding mode. A retarding mechanism is needed to provide phase and rate matching when the operating mode is switched.

U.S. Pat. No. 6,907,810 to Kim, incorporated by reference herein in its entirety, describes a system that is operable to produce a single tubular braid, or a pair of rectangular braids. It is thus possible to produce a braid having an eye where the single braid bifurcates into two rectangular braids.

Improved methods and apparatus are desired.

SUMMARY OF THE INVENTION

In some embodiments, a method is provided for using a braider having a track for guiding bobbin carriers and 4N horngears, where N is an integer>1. The horngears each have four horns for forming at least two paths. 4N bobbin carriers are positioned on the 4N horngears in a tubular braiding mode with the track and horngears configured to provide two paths intersecting each other, so that there are 2N carriers on each path, and a number of empty horns between successive pairs of horns on each path having bobbin carriers thereon alternates between two and four. The braider in the tubular braiding mode, to form a tubular braid section. The 4N bobbin carriers are positioned on the 4N horngears in a flat braiding mode. In the flat braiding mode, the track and horngears configured so that there are N separate closed paths that do not intersect each other, each path having three consecutive horngears, with four bobbin carriers on each path, and two empty horns between successive pairs of horns on each path having bobbin carriers thereon. The braider is operated in the flat braiding mode, to form a flat braid section. The braider is switched between the tubular braiding mode and flat braiding mode while N of the 4N horngears are free of any contact with any of the 4N bobbin carriers, to form a continuous braid having at least one tubular braid section and at least one flat braid section.

In some embodiments, a method is provided for using a braider having a track for guiding bobbin carriers and 4N horngears, where N is an integer>1. The horngears each have four horns for forming at least two paths. 4N bobbin carriers are positioned on the 4N horngears in a tubular braiding mode with the track and horngears configured to provide two paths intersecting each other, so that there are 2N carriers on each path, and a number of empty horns between successive pairs of horns on each path having bobbin carriers thereon alternates between two and four. The braider in the tubular braiding mode, to form a tubular braid section. The 4N bobbin carriers are positioned on the 4N horngears in a flat braiding mode. In the flat braiding mode, the track and horngears configured so that there are N separate closed paths that do not intersect each other, each path having three consecutive horngears, with four bobbin carriers on each path, and two empty horns between successive pairs of horns on each path having bobbin carriers thereon. The braider is operated in the flat braiding mode, to form a flat braid section. The braider is switched between the tubular braiding mode and flat braiding mode while N of the 4N horngears are free of any contact with any of the 4N bobbin carriers, to form a continuous braid having at least one tubular braid section and at least one flat braid section.

In some embodiments, a braider comprises 4N horngears, where N is an integer>1, and the horngears each have four horns capable of being arranged for forming at least two closed paths. 4N bobbin carriers are positioned on the 4N horngears. A track is provided, which is capable of being configured in a tubular braiding mode or a flat braiding mode. In the tubular braiding mode, there are two intersecting paths with 2N carriers on each path, and a number of empty horns between successive pairs of horns on each intersecting closed path having bobbin carriers thereon alternates between two and four. In the flat braiding mode, the 4N bobbin carriers are arranged on the 4N horngears, so that there are N separate closed paths, each path having three consecutive horngears, with four bobbin carriers on each path, and two empty horns between successive pairs of horns on each path having bobbin carriers thereon. A switch is provided for switching the track between the tubular braiding mode and flat braiding mode while N of the 4N horngears are free of any contact with any of the 4N bobbin carriers, for forming a continuous braid having at least one tubular braid section and at least one flat braid section.

BRIEF DESCRIPTION OF THE DRAWINGS

FIG. 16 is an isometric view of a braid formed by the apparatus of FIG. 3.

DETAILED DESCRIPTION

Figure 1A:
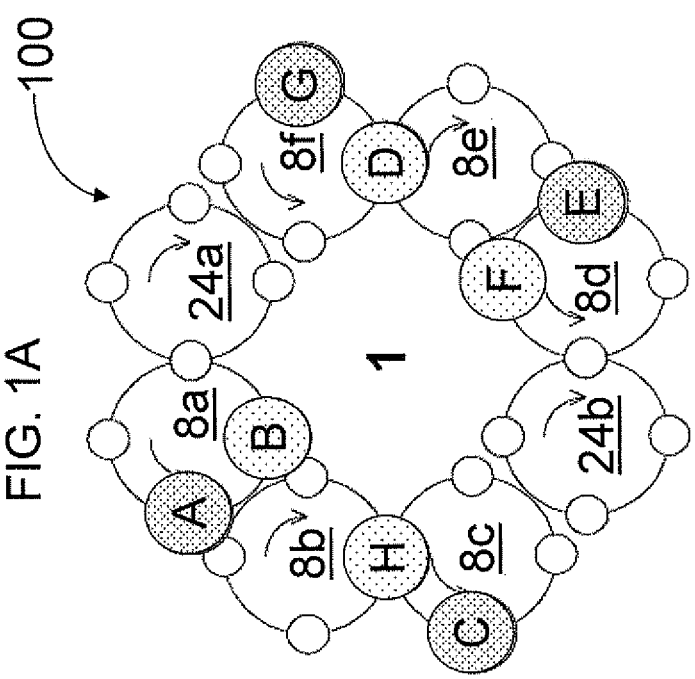
FIGS. 1A to 1C are schematic diagrams showing the positioning of bobbin carriers on an exemplary apparatus.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 16 is an isometric view of a continuous braid 160 having at least one tubular braid section 160t and at least one flat braid section 160f. The flat braid section 160f has a plurality of flat braids 162 and slots 164 separating the flat braids. Each flat braid 162 is in the form of an open circular arc of slightly less than 360/N degrees, where N is the number of flat braids 162 in the flat braid section 160f. The individual strands of yarn run continuously between the tubular and flat braid sections 160t and 160f. In the tubular braid sections 160t, each strand traces out a helical path. In the flat braid sections 160f, each strand follows a helical path for slightly less than 360/N degrees, and then the tangential component of its direction vector reverses sign while the longitudinal component remains constant.

Figure 1B:
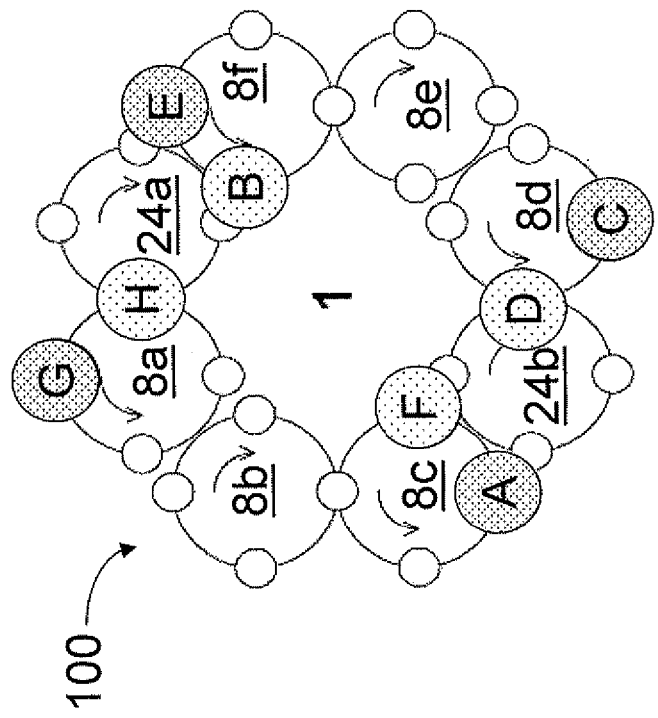
Figure 2B:
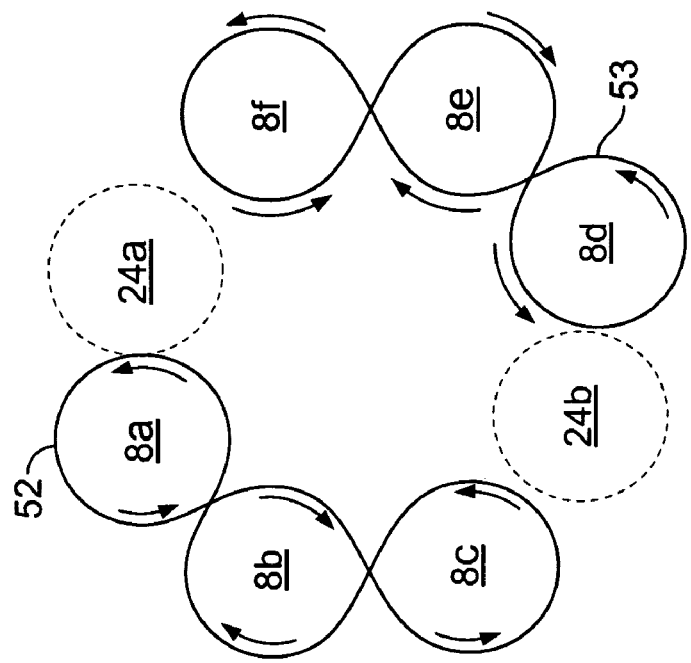
FIG. 2B is a diagram of the paths followed by bobbin carriers in the flat braiding mode.

FIGS. 1A and 1B are schematic diagrams of an exemplary braider 100, capable of forming the braid 160. FIGS. 1A and 1B show the arrangement of bobbin carriers A-H and horngears 8a-8f, 24a-24b. System 100 is a 16-end braiding machine of a type with eight carriers A-H used to carry and interlace the yarns around the machine, propelled by eight horngears 8a-8f, 24a-24b. As shown in FIG. 1A, this machine produces a single 8-end tubular braid. Braider 100 is capable of operating in the tubular braiding mode (FIG. 2A), for making a single tubular braid, or in a flat braiding mode (FIG. 2B) for making two 4-end flat braids. Bobbin carriers A-H (FIGS. 1A, 1B) are transported on horngears 8a-8f in both modes. The bobbin carriers A-H do not interact with the horngears 24a-24b in the flat braiding mode (FIG. 2B). Thus, FIG. 1A represents possible positions of bobbin carriers A-H in either tubular braiding mode or flat braiding mode. FIG. 1B represents possible positions of bobbin carriers A-H in tubular braiding mode, but not in the flat braiding mode.

Figure 1C:
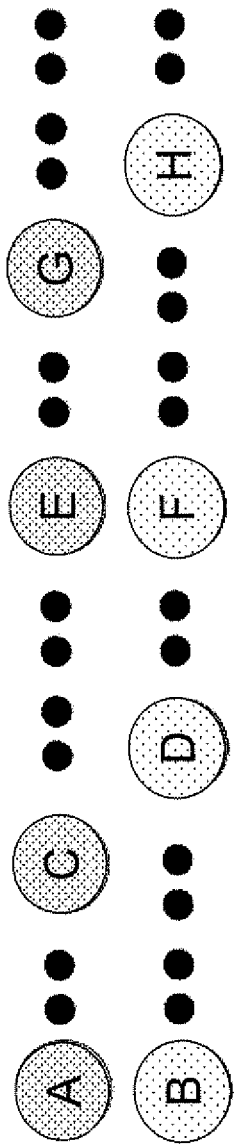
Figure 2A:
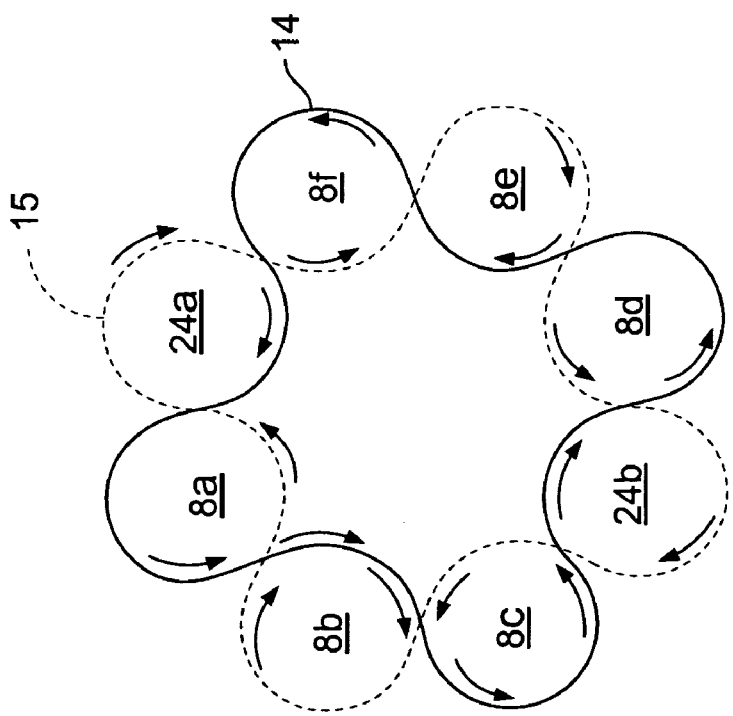
FIG. 2A is a diagram of the paths followed by bobbin carriers in the tubular braiding mode.

FIG. 1C shows how the bobbin carriers A-H are staggered in the two paths while the system operates in the tubular braiding mode (FIGS. 1A, 1B, 2A). Each dot in FIG. 1C represents an empty horn on one of the horngears 8a-8f, 24a-24b (i.e, a horn without a carrier on it). With carrier A positioned on the horngear 8a adjacent to horngear 24a (moving away from horngear 24a), and carrier B positioned on the horngear 8a moving towards horngear 24a, the counterclockwise path has carrier spacings of 2 (empty horns), 4 (empty horns), 2, 4. The clockwise path has carrier spacings of 4 (empty horns), 2 (empty horns), 4, 2. Staggering the bobbin carriers in the manner shown in FIG. 1C ensures that horngears 24A and 24B are both periodically free from any contact with any of the bobbin carriers A-H at the same time, while the system 100 is in the tubular braiding mode.

The bobbin carrier A is designated a master carrier, and is used for determining correct position for the rest of the bobbin carriers B-H.

Switching between the tubular and flat braiding modes (in either direction) can be performed any time the bobbin carriers are positioned with two carriers interacting with each of the horngears 8a, 8c, 8d, and 8f. In this manner, switching can be accomplished without interrupting the operation or speed of the system 100, without changing the rotation speed of the horngears 8a-8f, 24a, 24b, and without changing the speed of translation of any of the bobbin carriers 7.

FIG. 2A shows the paths traveled by the bobbin carriers A-H in the tubular braiding mode. Four of the bobbin carriers A, C, E, G, travel in the counter-clockwise direction, as shown by the dashed curve. Four of the bobbin carriers B, D, F, H travel in the clockwise direction, as shown by the solid curve.

At a time when none of the eight bobbin carriers A-H is in contact with any of the horngears 24, the paths are switched, to remove horngears 24A, 24B from the active paths, to switch to the flat braiding mode. The horngears 24A, 24B can continue to rotate, but no bobbin carriers are fed to horngears 24A, 24B until the system is switched back to the tubular braiding mode. The horngears 8a, 8f adjacent to horngears 24A, and the horngears 8c and 8d adjacent to horngear 24B reverse the direction of the bobbin carriers that are received by the adjacent horngears 8a, 8f, 8c, 8d, to form two separate closed loops, as shown in FIG. 2B. Note that in FIG. 2B, the dashed lines on horngears 24a, 24b signify that these two horngears do not interact with the carriers A-H, whereas in FIG. 2A, the dashed line indicates a separate path, along which carriers travel in the opposite direction from the path indicated by the solid line.

In the flat braiding mode of FIG. 2B, each path has four bobbin carriers traveling in the same direction, guided by three horngears, with a spacing of two empty horns (270 degrees) between each pair of consecutive carriers. That is, if there is a first carrier positioned at a given location in inertial space, a second carrier will occupy the same position in inertial space when the horngears have rotated 270 degrees. At the moment in time that the second carrier occupies the same location in inertial space, it will not, however, be in contact with the same horn(s).

Although FIGS. 1A and 1B show a system having eight horngears 8a-8f, 24a-24b and eight bobbin carriers A-H, the methods described herein can be applied to any configuration with any multiple of four horngears and four bobbin carriers. A system having 4N horngears and 4N bobbin carriers (for any integer value of N>1) can be operated in a tubular braiding mode for making a single 4N-ended braid, or in a flat braiding mode for making N flat braids, each of the 4-ended type. Regardless of the value of N, every fourth horngear is of a type that can be switched in or out of the active braiding loops. Although exemplary mechanisms are described below for switching the horngears 24a, 24b in and out of the carrier paths, other switching mechanisms may be used.

For any integer N>1, in the tubular braiding mode, the clockwise path has carriers staggered with spacings of N×{4, 2} empty horns, and the counter-clockwise path has carriers staggered with spacings of N×{2, 4} empty horns.

Figure 3:
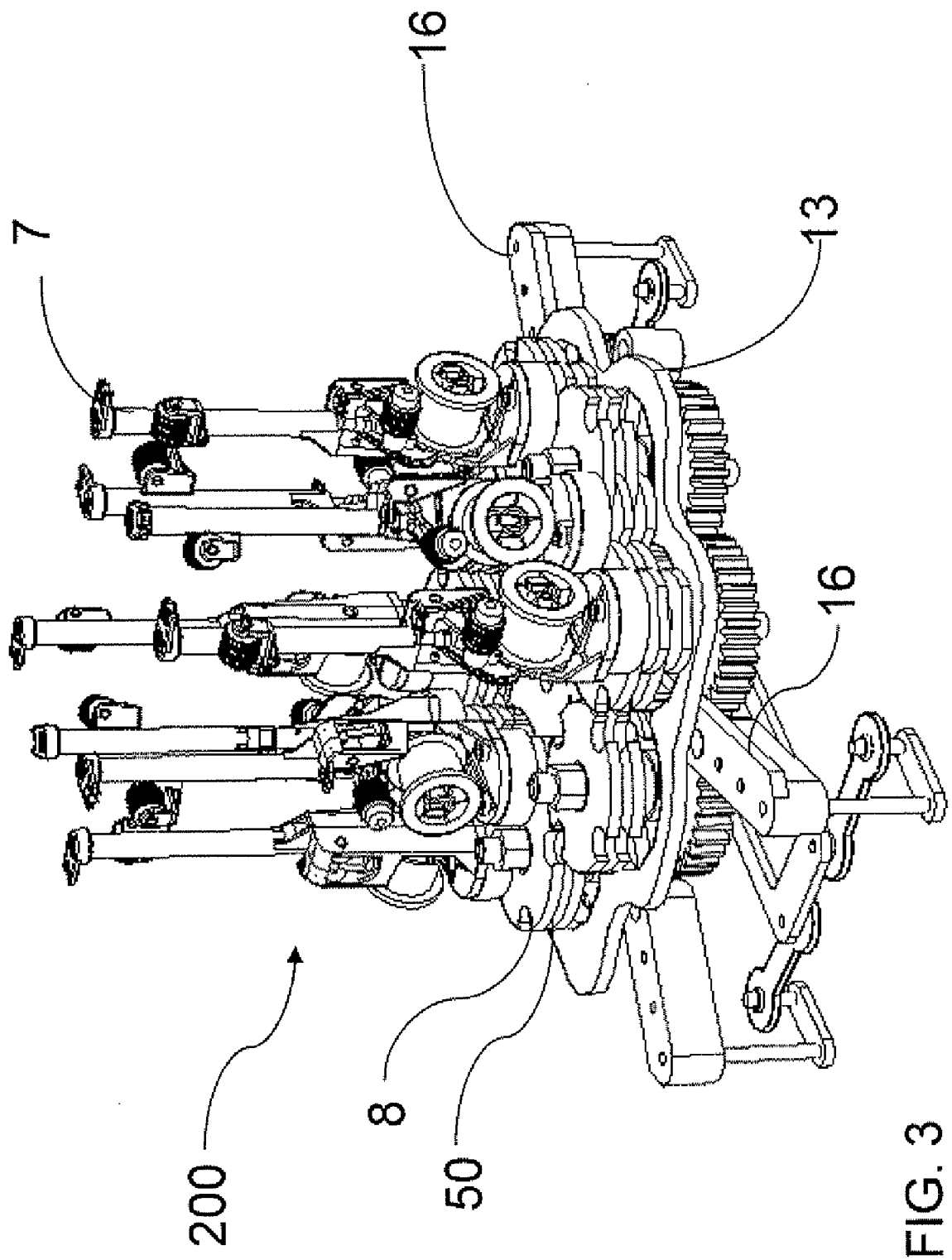
FIG. 3 is an isometric view of an exemplary braider.

FIG. 3. is an isometric view of a 16-end braiding machine 200 of a type with eight carriers 7 used to carry and interlace the yarns around the machine, propelled by eight horngears 8. Each horngear 8 has four horns 50, which engage the carriers 7, moving the carriers along one of the paths, and transferring carriers between horngears 8.

Figure 4:
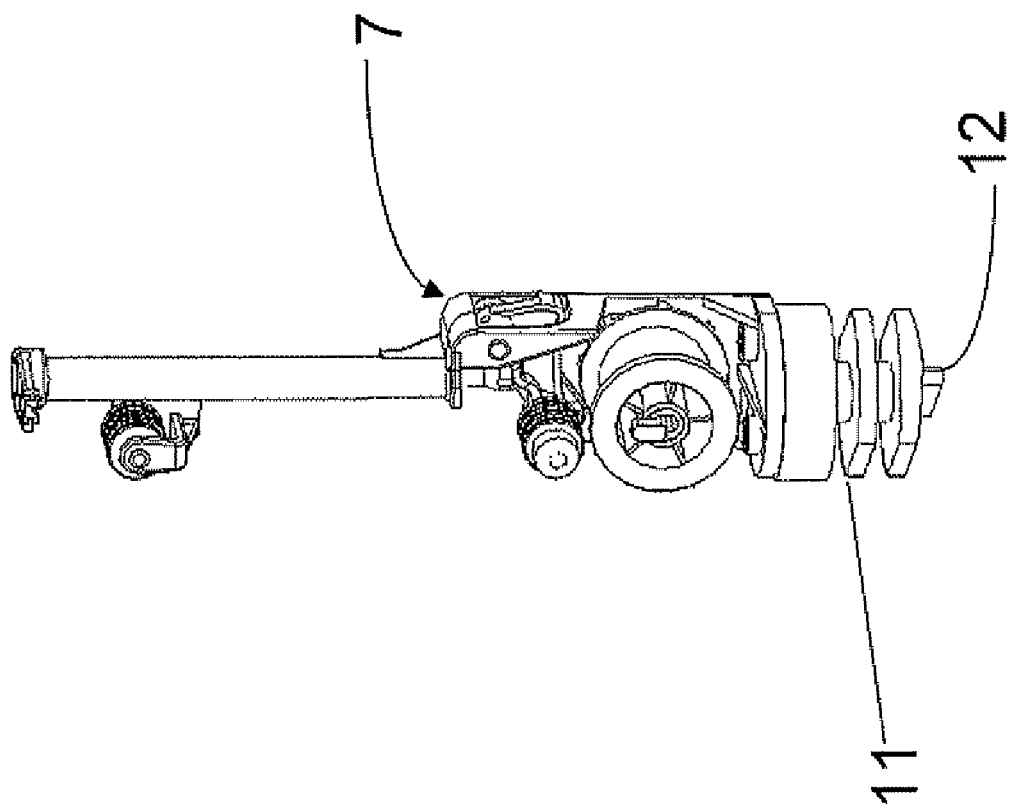
FIG. 4 is an isometric view of a bobbin carrier suitable for use in the braider of FIG. 3.

FIG. 4 shows a yarn carrier 7, suitable for use in the braider 200 of FIG. 3, riding on top of a carrier foot 11 and guided by the carrier foot blade 12. The braider 200 has a drive system for rotating each of the horngears 8 at a constant rotational speed before, during and after switching of the switch.

Figure 5A:
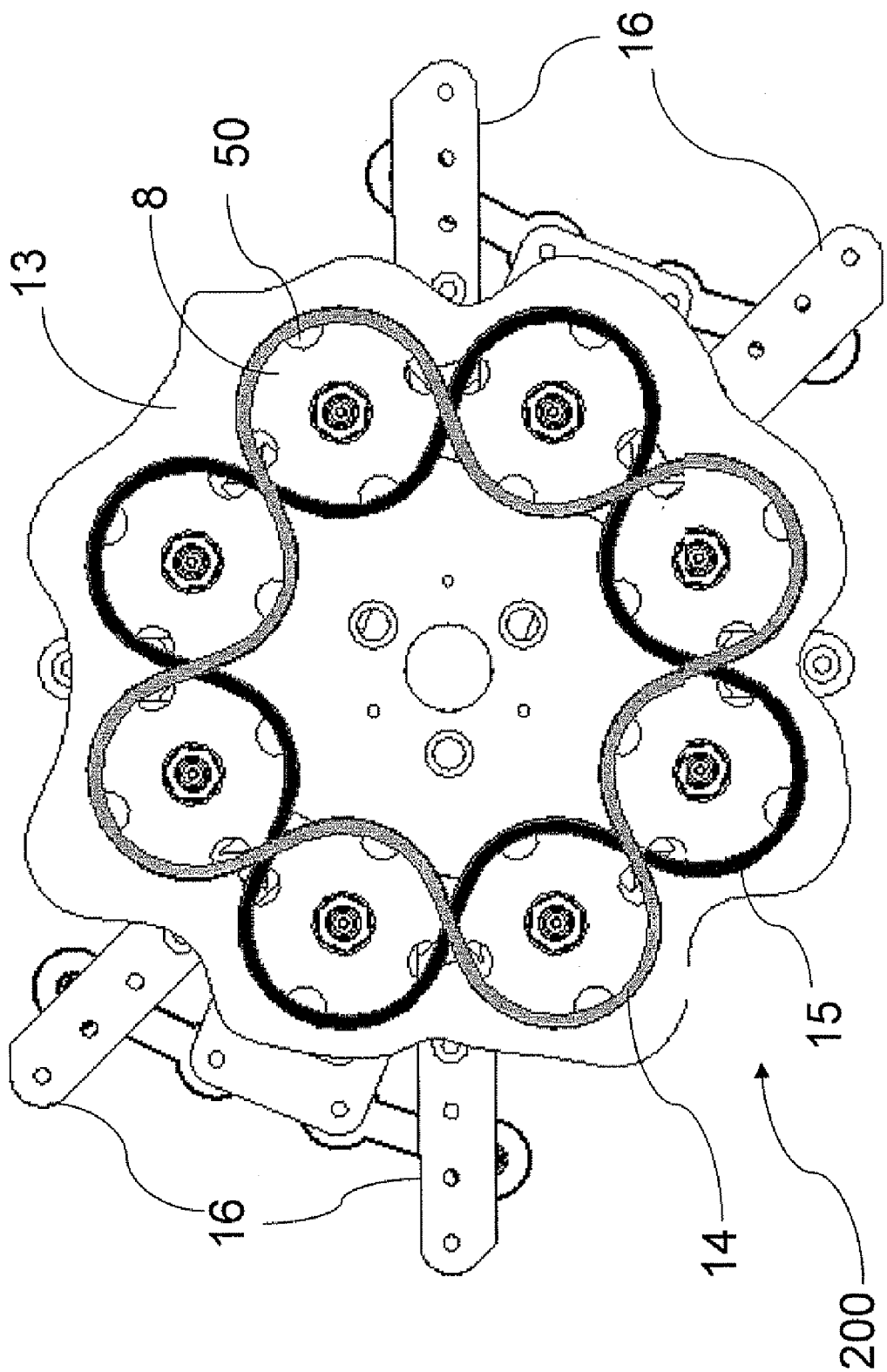
FIG. 5A is a plan view of the track of the braider of FIG. 3 switched to the tubular braiding mode.

FIG. 5A is a top view of the braider with a cut-away outside track 13 for ease of visibility exposing the linkage mechanism 16. In addition, the two intersecting carrier paths for a non-bifurcating braid, 14 and 15 are shown.

Figure 5B:
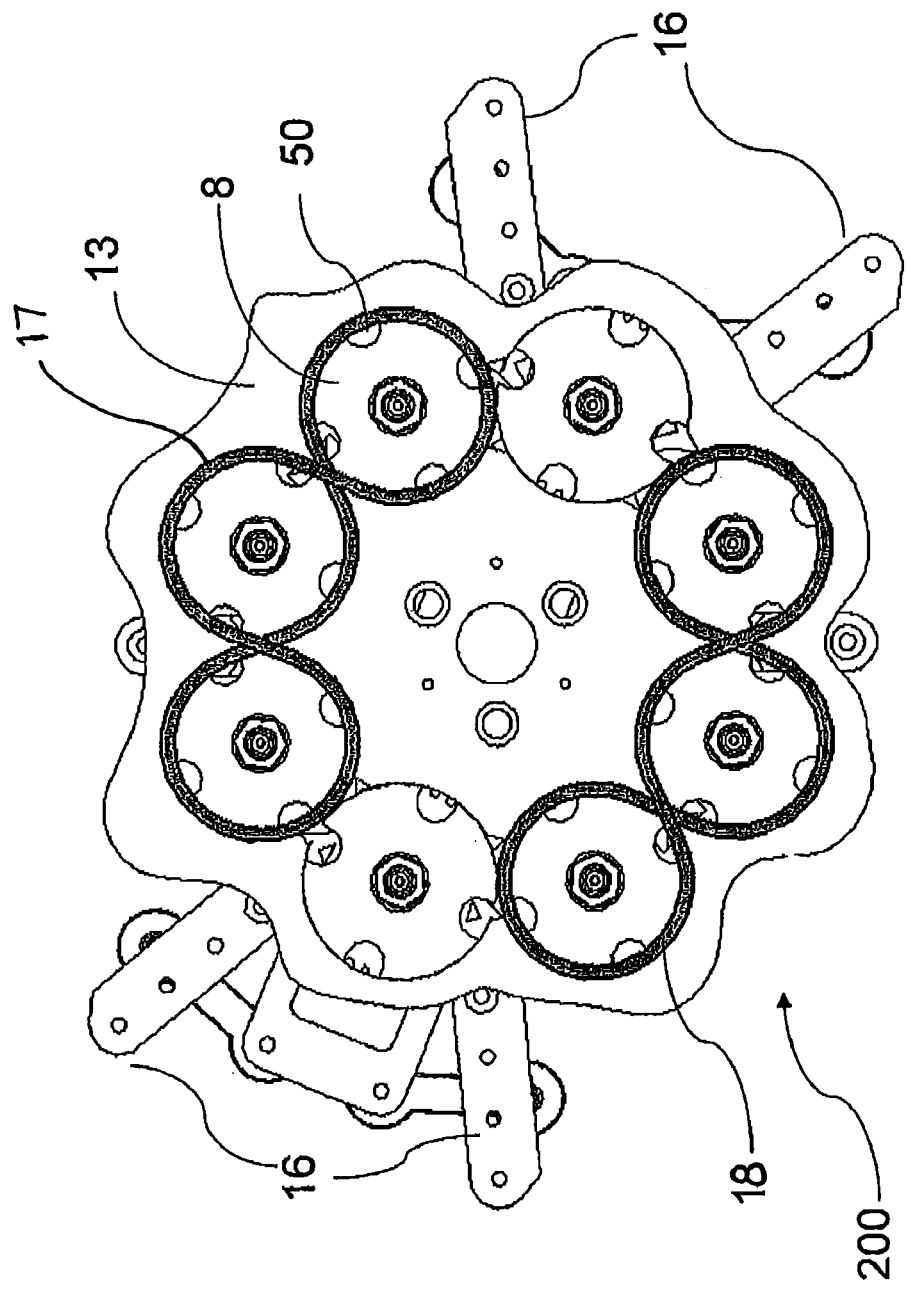
FIG. 5B is a plan view of the track of the braider of FIG. 3 switched to the flat braiding mode.

FIG. 5B shows a top view of the braider with a cut-away outside track 13 for ease of visibility exposing the linkage mechanism 16. In addition, the two separate carrier paths for two bifurcating braids, 17 and 18 are shown.

The braiding machine 200 has a track 14, 15 capable of being configured in either of two different modes at any one time. In the tubular braiding mode, the track includes two intersecting paths 14, 15 with 2N (=4 in FIG. 3) carriers 7 on each path 14, 15, and a number of empty horns between successive pairs of horns on each intersecting closed path having bobbin carriers 7 thereon alternates between two and four.

In the flat braiding mode, the 4N bobbin carriers are arranged on 3N of the 4N horngears, so that there are N separate closed paths 52, 53, each path having three consecutive horngears, with four bobbin carriers on each path, and two empty horns between successive pairs of horns on each path having bobbin carriers 7 thereon. For example, for the apparatus of FIG. 3 in the flat braiding mode, there are eight carriers 7, arranged on six of the eight horngears 8a-8f, with two separate closed paths, each path having three horngears.

A switch is provided for switching the track 14, 15 between the tubular braiding mode and flat braiding mode while N of the 4N horngears 24a, 24b are free of any contact with any of the 4N bobbin carriers 7. The track 14, 15 includes a plurality of bridge sections 19 arranged so that every fourth horngear 24a, 24b is positioned adjacent to and between a respective pair of bridge sections 19, each bridge section switchable by operation of the switch, between a first position (FIG. 10) in which the track connects every fourth horngear to adjacent horngears on either sides thereof, and a second position (FIG. 11) in which the track reverses direction on each side of every fourth horngear.

Figure 10:
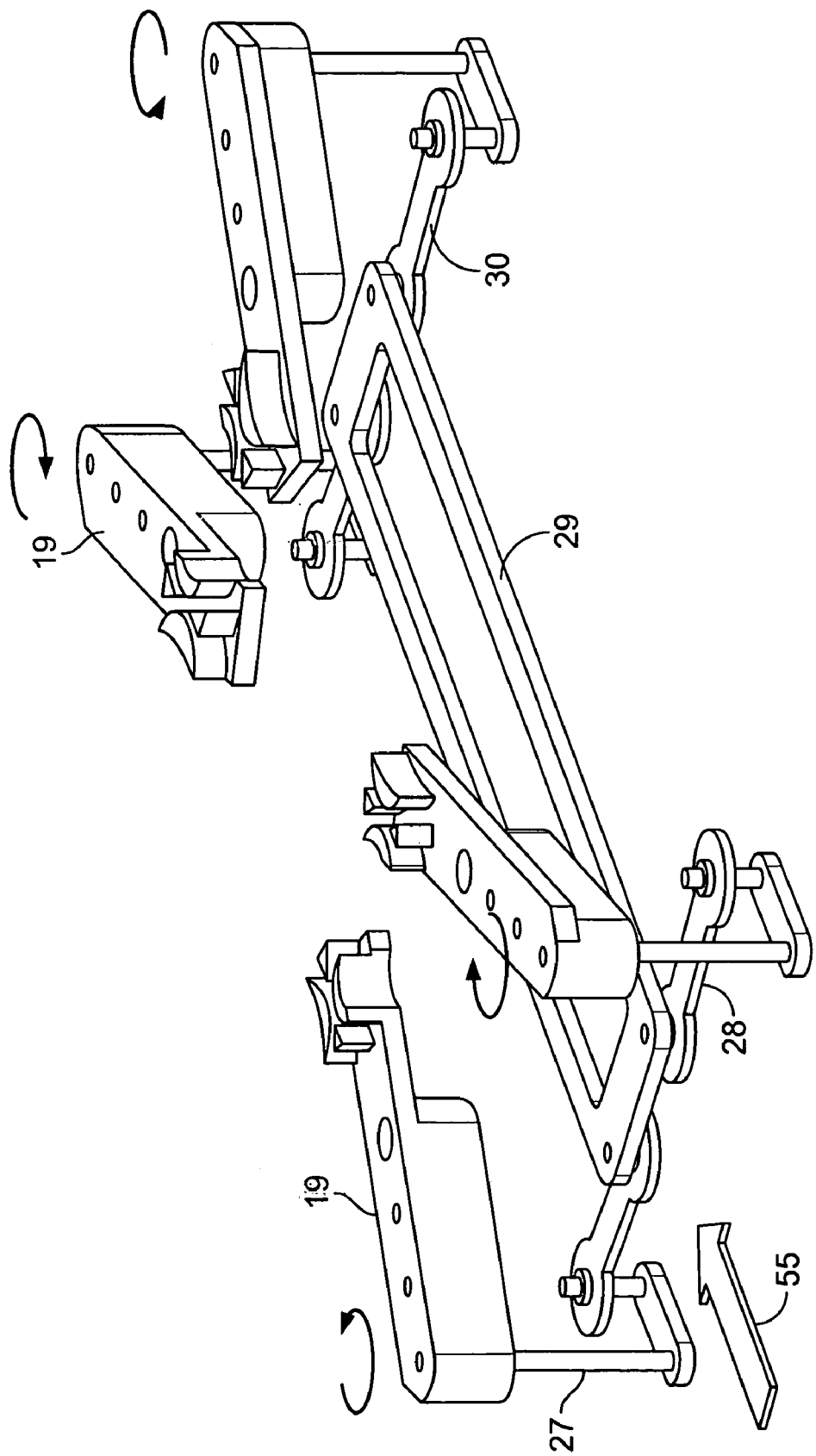
FIG. 10 is an isometric view of the track switching apparatus in the tubular braiding position.
Figure 11:
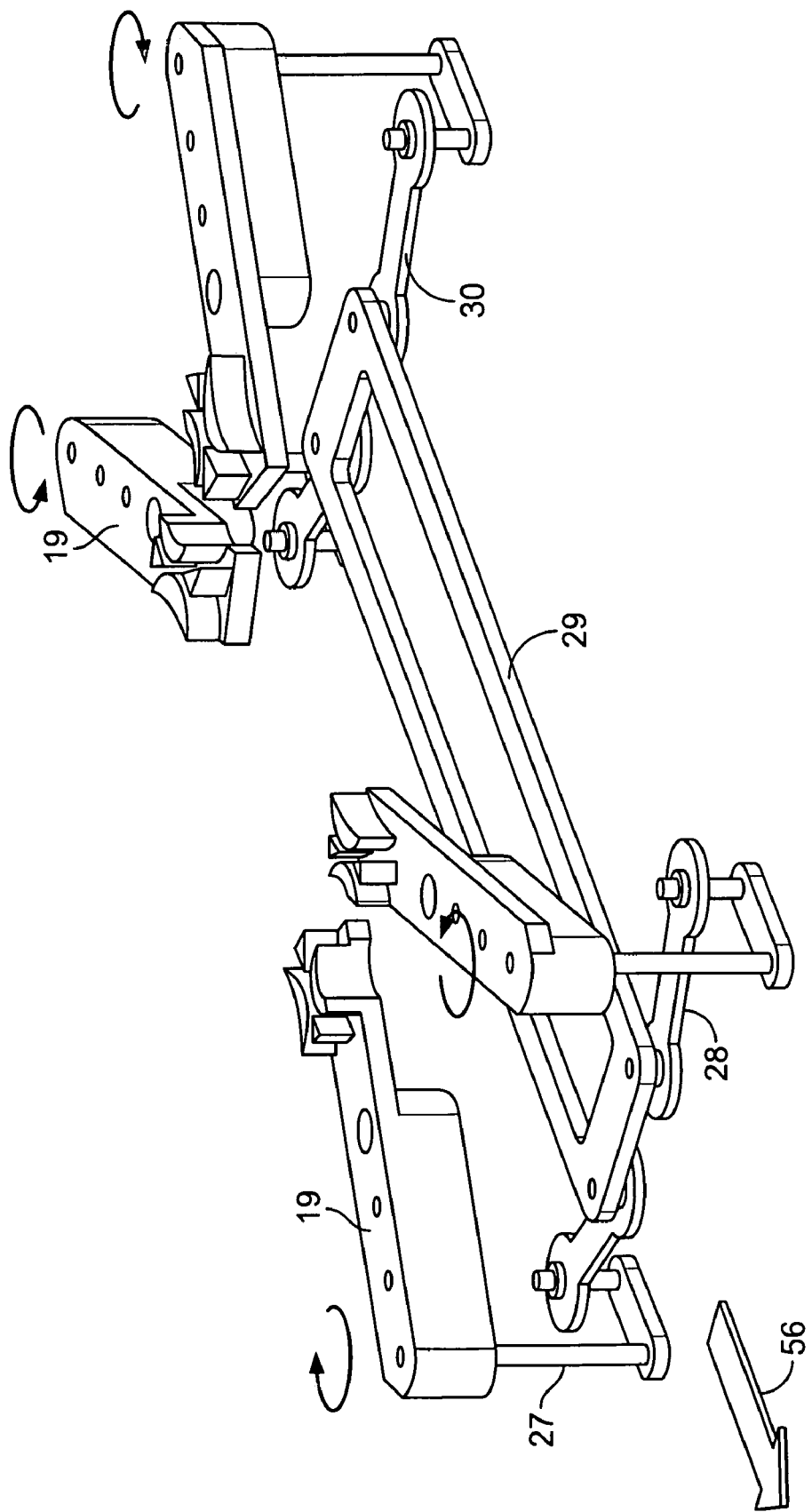
FIG. 11 is an isometric view of the track switching apparatus in the flat braiding position.

An exemplary switching mechanism is best seen in FIGS. 10 and 11, and includes a set of modified bridge assemblies 19. The two or more bridge sections 19 are connected by a linkage 28, 29, 30, so that the two or more bridge sections 19 are switchable between first and second positions by actuation of the linkage.

FIG. 10 shows the linkage used to drive the bridges 19. Drive link 29 moves connecting link 28, which rotates bridge lever 27, which rotates bridge 19. The arrows show the direction of movement for non-bifurcating braiding.

In FIG. 10, the modified bridge assemblies 19 are in the in standard position for tubular braiding, with the tips aligned. In FIG. 11, the modified bridge assemblies 19 are in the in bifurcation position for flat braiding, with the curves aligned. The driving forces 55, 56 shown in FIGS. 10 and 11, respectively, can be applied to drive link 29 by a linear motor, air cylinder, cam, crank, or the like.

FIG. 11 shows the linkage used to drive the bridges 19. Drive link 29 moves connecting link 28, which rotates bridge lever 27, which rotates bridge 19. The arrows show the direction of movement for bifurcated braiding.

Moving the Drive Link in the direction shown in FIG. 10 forces the linkage to rotate around the Fixed Pins causing the ends of the modified bridge assemblies 19 to rotate outward and thus aligning tips. This completes the two paths 14, 15 that encircle the braider 200 as shown in FIG. 5A, by connecting the slots around horngears 24a, 24b with the slots around the neighboring horngears 8a, 8c, 8d, and 8f. Any bobbin carrier 7 that traverses the slots 14, 15 around horngears 24a and 24b are automatically transferred to the neighboring horngears.

Moving the Drive Link in the direction shown in FIG. 11 forces the linkage to rotate around the Fixed Pins causing the ends of the modified bridge assemblies 19 to rotate inward and thus aligning curves. This reroutes the two paths as shown in FIG. 5B, so that any bobbin carrier that is transferred to horngears 8a and 8c circle completely around horngears 8a and 8c, and return to horngear 8b, without being transferred to horngears 24a or 24b. Similarly, any bobbin carrier that is transferred to horngears 8d and 8f circle completely around horngears 8d and 8f, and return to horngear 8e, without being transferred to horngears 24a or 24b.

By switching back and forth between the tubular and flat braiding modes, the system 200 forms a succession of respective tubular and flat braid sections. The result is a continuous braid having at least one tubular braid section at a first location along the longitudinal axis and at least one flat braid section at a second location along the longitudinal axis. The continuous braid may have any desired number of tubular and flat braid sections.

Figure 6:
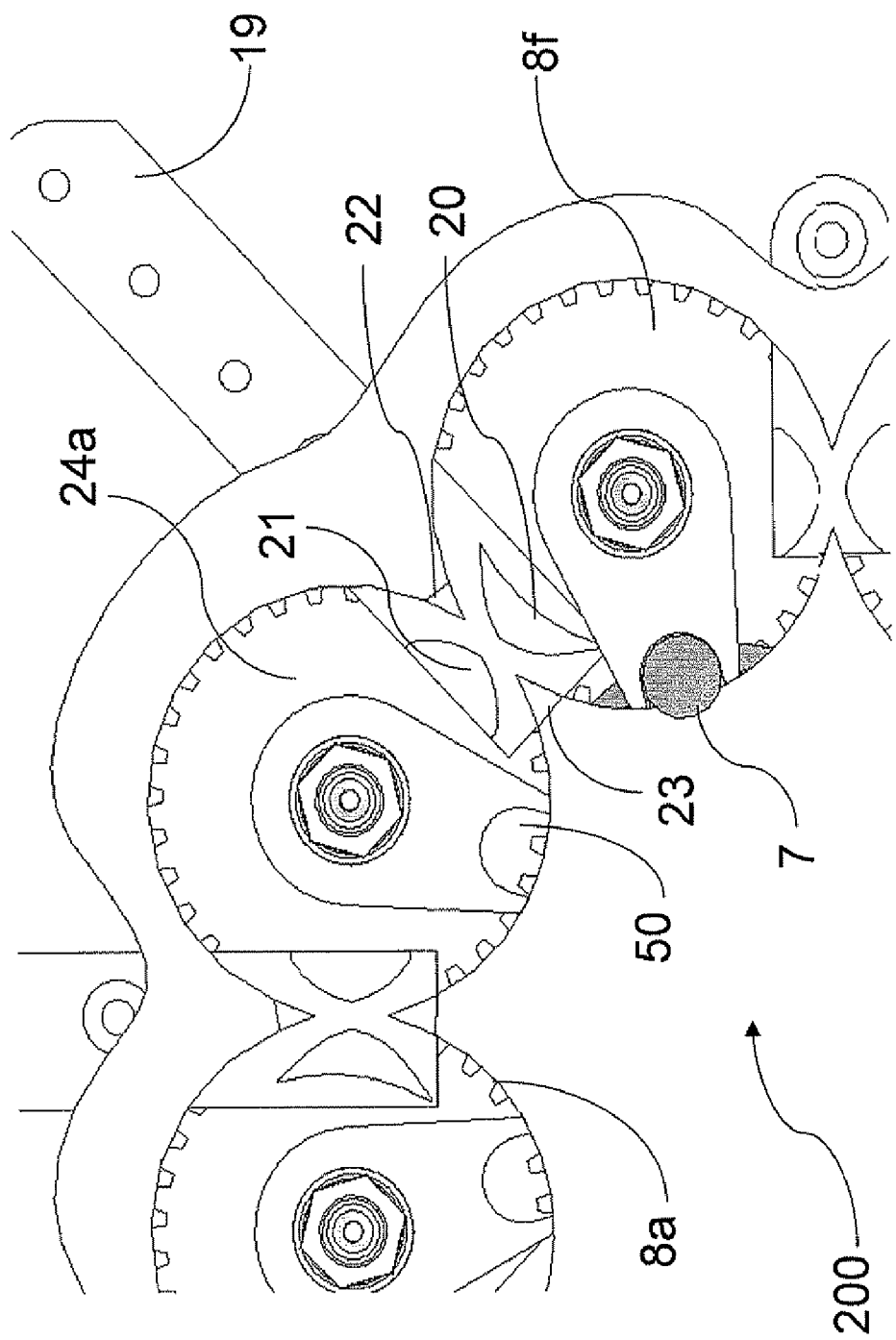
FIGS. 6-8 are plan views of a portion of the track of FIG. 5A, configured to transfer a bobbin carrier between a regular horngear that is used in both tubular and flat braiding modes and a switched horngear that is only used in the tubular braiding mode.
Figure 7:
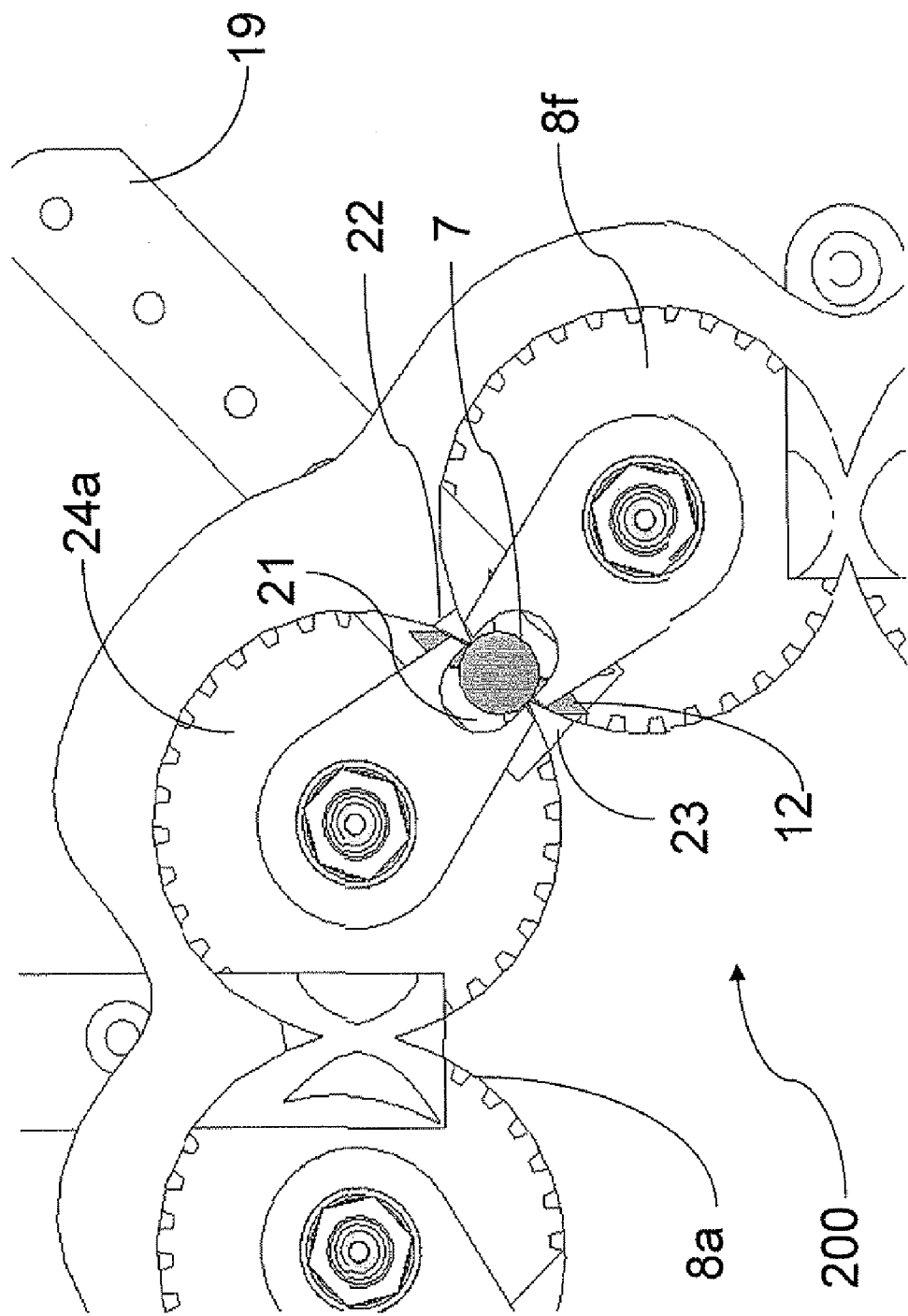
Figure 8:
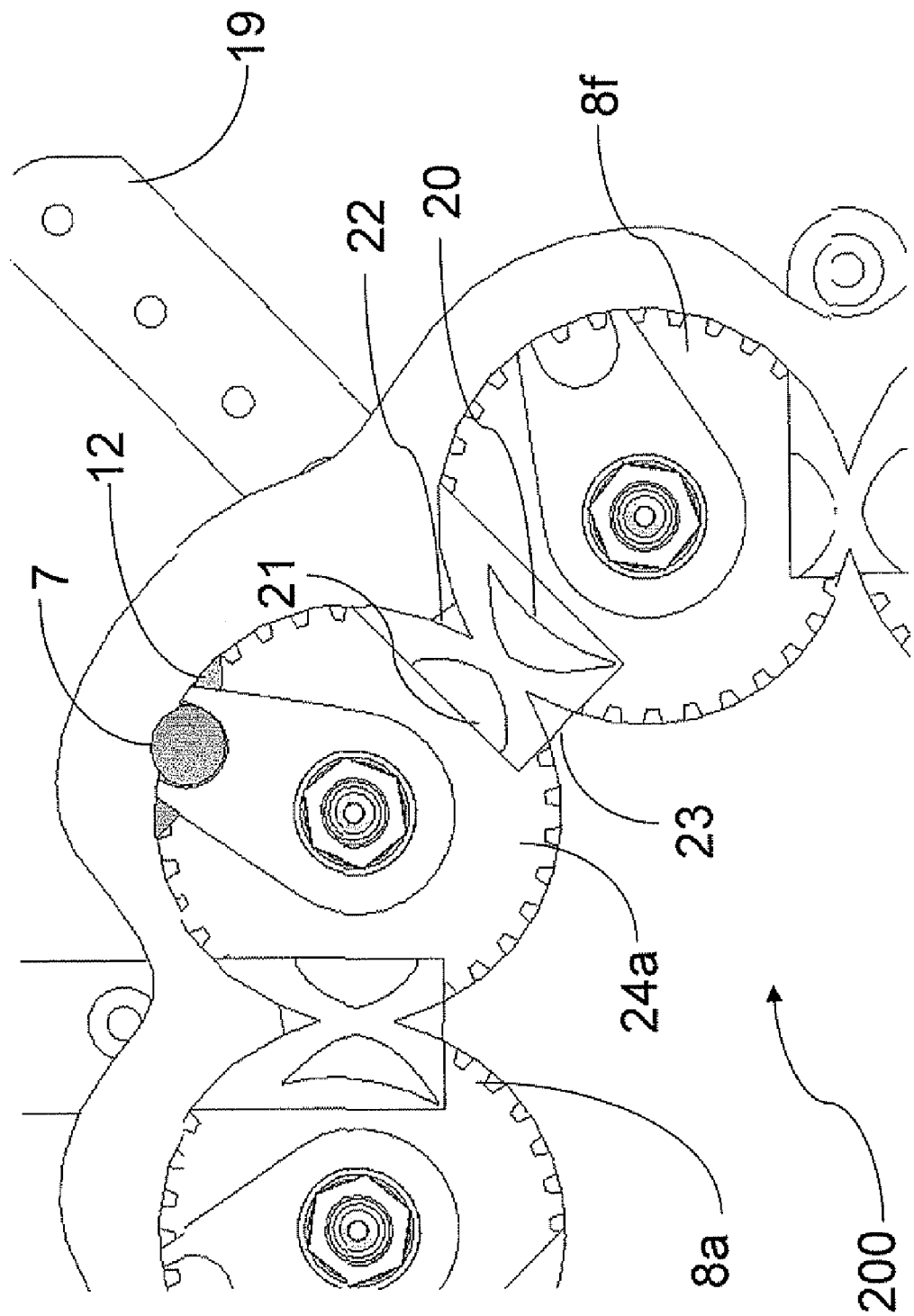

FIGS. 6-8 show details of a transfer of a bobbin carrier 7 from horngear 8f to horngear 24a, while the switch is in the tubular braiding position. FIG. 6 detail shows the bridge 19 used for switching the carriers in the non-bifurcating position, with its guiding features: bifurcating tip 20, non-bifurcating tip 21 outside tip 22 and inside tip 23. The view of horngears 8f, 24a, 8a have been simplified for visibility by reducing the number of horns shown in the drawing from 4 to 1, but one of ordinary skill understands that the remaining three horns are present. Additionally the drawing of yarn carrier 7 has been simplified for visibility to show the carrier foot 12. As shown, yarn carrier 7 is captured by horngear 8 and is guided by inside track 10 by contacting the carrier foot 12. As horngear 8 rotates, the yarn carrier moves with it and the inside track guides the carrier in a circular path.

FIG. 7 detail shows the horngear 8f has rotated to the transfer position. Since horngear 8f and horngear 24a are coupled together in a 1 to 1 ratio, as horngear 8f reaches the transfer position, horngear 24a meets it to receive yarn carrier 7. At the same time carrier foot 12 is guided by inside tip 23 and bifurcating tip 20 and then non-bifurcating tip 21 and outside tip 22 forcing yarn carrier 7 into horngear 24a.

FIG. 8 detail shows the completion of the transfer of yarn carrier 7 to horngear 24a in order for it to continue around non-bifurcating path 15. This process repeats for all eight yarn carriers and the result is the 8-end tubular braid 160.

Figure 9:
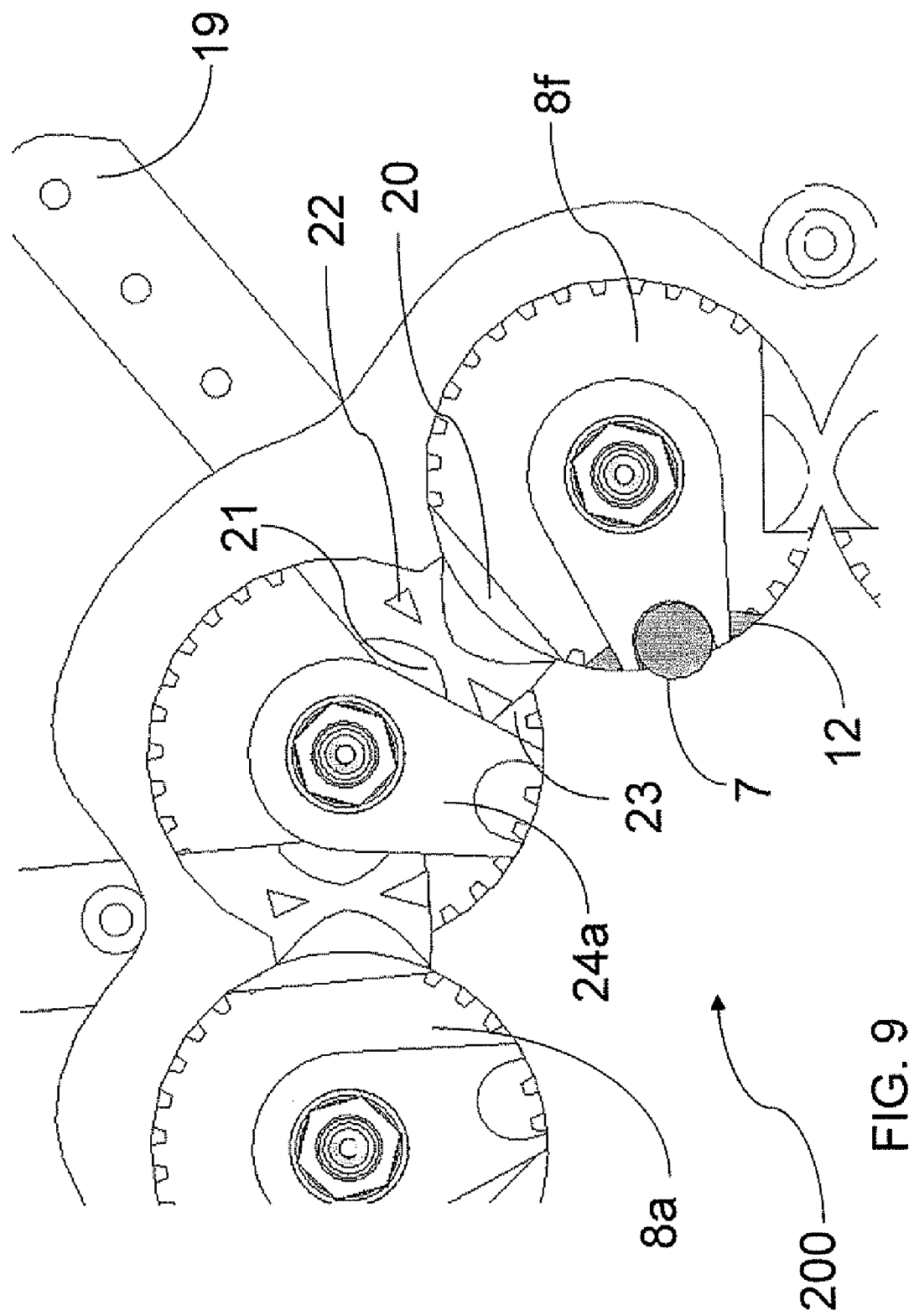
FIG. 9 is a plan view of the portion of the track shown in FIGS. 6-8, after switching the track to the flat braiding mode.

FIG. 9 detail shows the bridge 19 rotated into the bifurcating position. By doing so, outside tip 22 has rotated away from outside track 9 and inside tip 23 has rotated away from inside track 10. Bifurcating tip 20 as rotated so that the curve of the bifurcating tip 20 matches the curves of outside track 9 and inside track 10. Yarn carrier 7 is captured by horngear 8f and is guided by inside track 10 by contacting the carrier foot 12. The horngear 8f transmits the carrier 7 about 360 degrees, to reverse its direction and transfer the carrier 7 back to horngear 8e (shown in FIG. 1A).

When horngear 8f has rotated to the transfer position, the carrier foot 12 is guided by the bifurcating tip 20, so no transfer takes place. As horngear 8f continues to rotate, yarn carrier 7 continues around the bifurcating path (along horngears 8d, 8e and 8f), for flat braiding. Yarn carrier 7 continues around with horngear 8f and guided by outside track 9. As there are 4 locations of movable bridge 19, two 4-end flat braids are formed. When a sufficient length of bifurcated braid is formed, the bridges 19 are rotated back to the non-bifurcating position (shown in FIG. 10), and braiding continues for the 8-end tubular braid.

FIGS. 12-15 show a braider 300 having an alternative mechanical switch arrangement. Rather than moving the intersecting portion of the two paths 14, 15 (as in FIG. 3), a gate 33 is inserted or retracted to redirect the carriers 13. The braider 300 has yarn carriers 31, latch quoits 32, gates 33, standard quoits 34, an inside plate 35, an outside plate 36 and horngears (8a-8f shown in FIGS. 7-9. The horngears 37 drive the yarn carriers 31 around the braider guided by the interlaced tracks 38 and 39.

Figure 12:
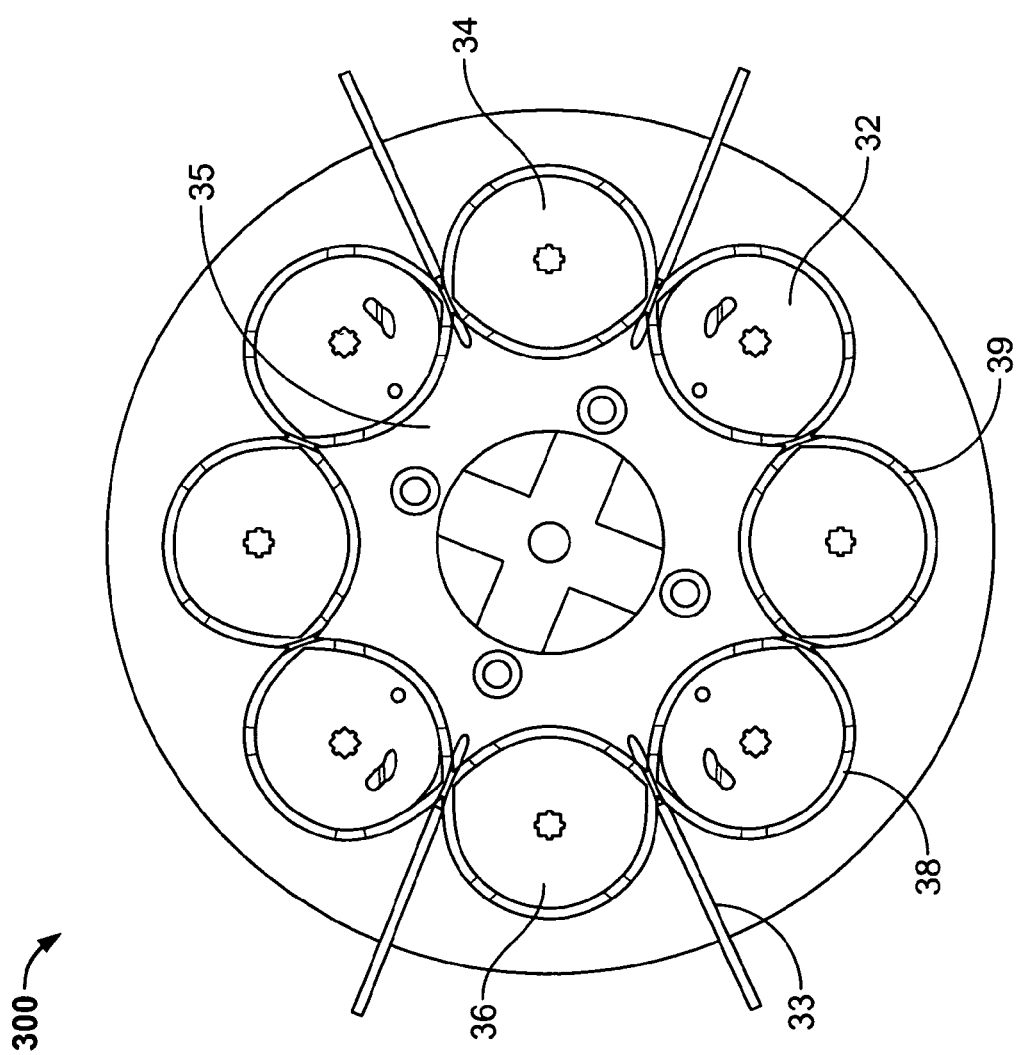
FIG. 12 is a plan view of a variation of the braider, including a different switching mechanism.

The layout and arrangement of the paths 38, 39 and the positions of the bobbin carriers 13 can be the same as discussed above with respect to FIGS. 1A-1C and 2A-2B. FIG. 12 shows the track configuration for the carriers in a non-bifurcating braid. The carriers 31 travel in two different intersecting tracks 38, 39 circulating in opposite directions resulting in the interlacing of the yarns.

Figure 13:
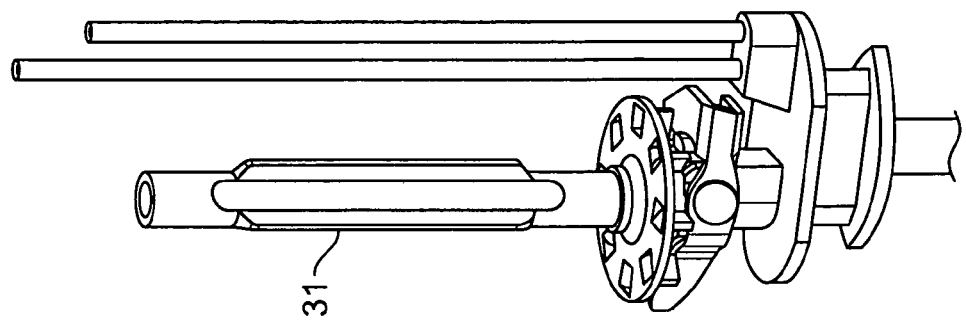
FIG. 13 is an isometric view of a bobbin carrier suitable for use in the braider of FIG. 12.

FIG. 13 shows a yarn carrier 31 for use with braider 300. The carrier 31 has a different foot from the carrier 7 shown in FIG. 4.

Figure 14:
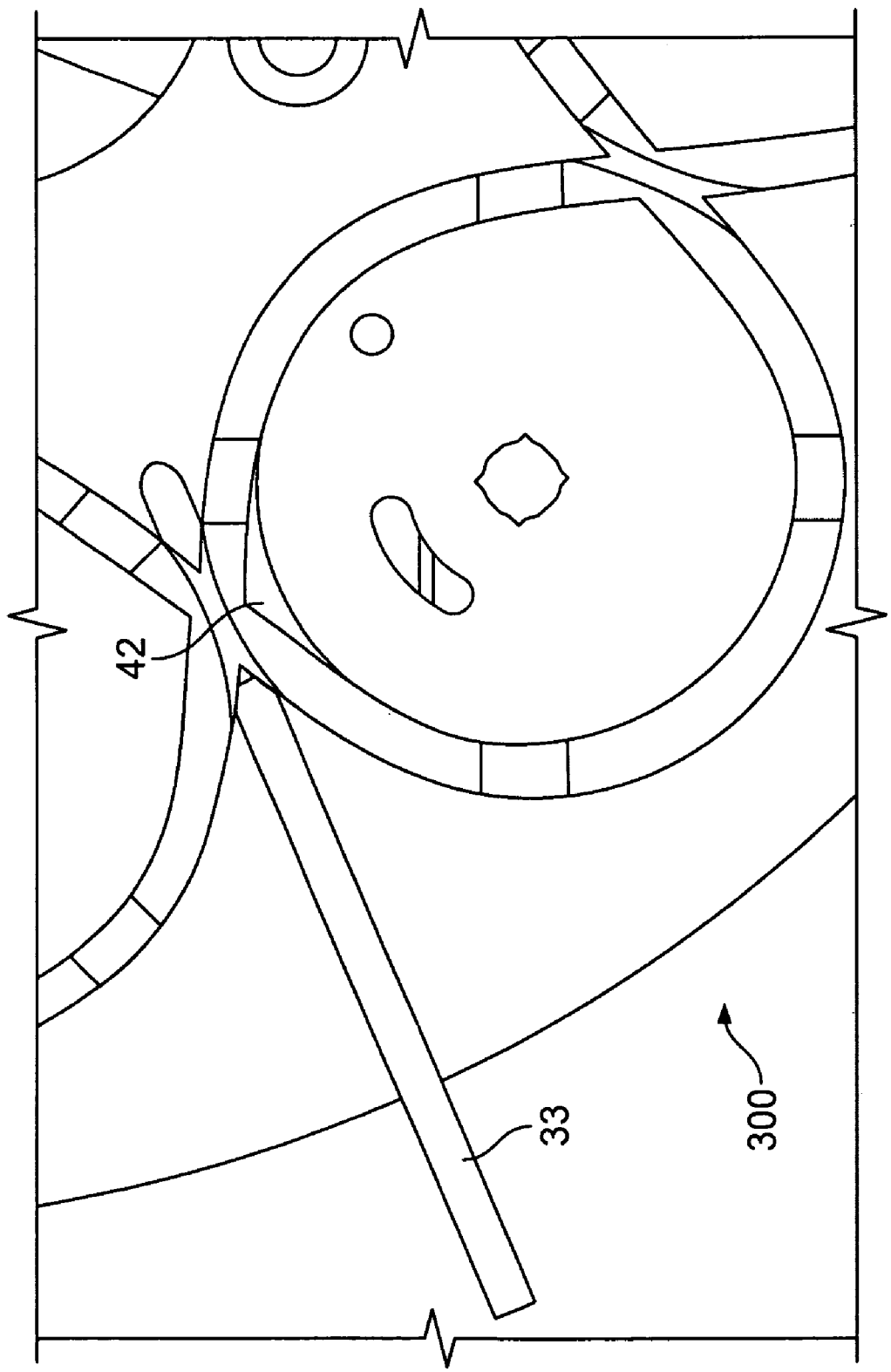
FIG. 14 shows a detail of the braider of FIG. 12, in the tubular braiding position.

FIG. 14 is a detail showing the position of the gate 33 and latch 42. By retracting the gate 33 and injecting the latch 42 the carriers are allowed to cross over the intersecting track.

Figure 15:
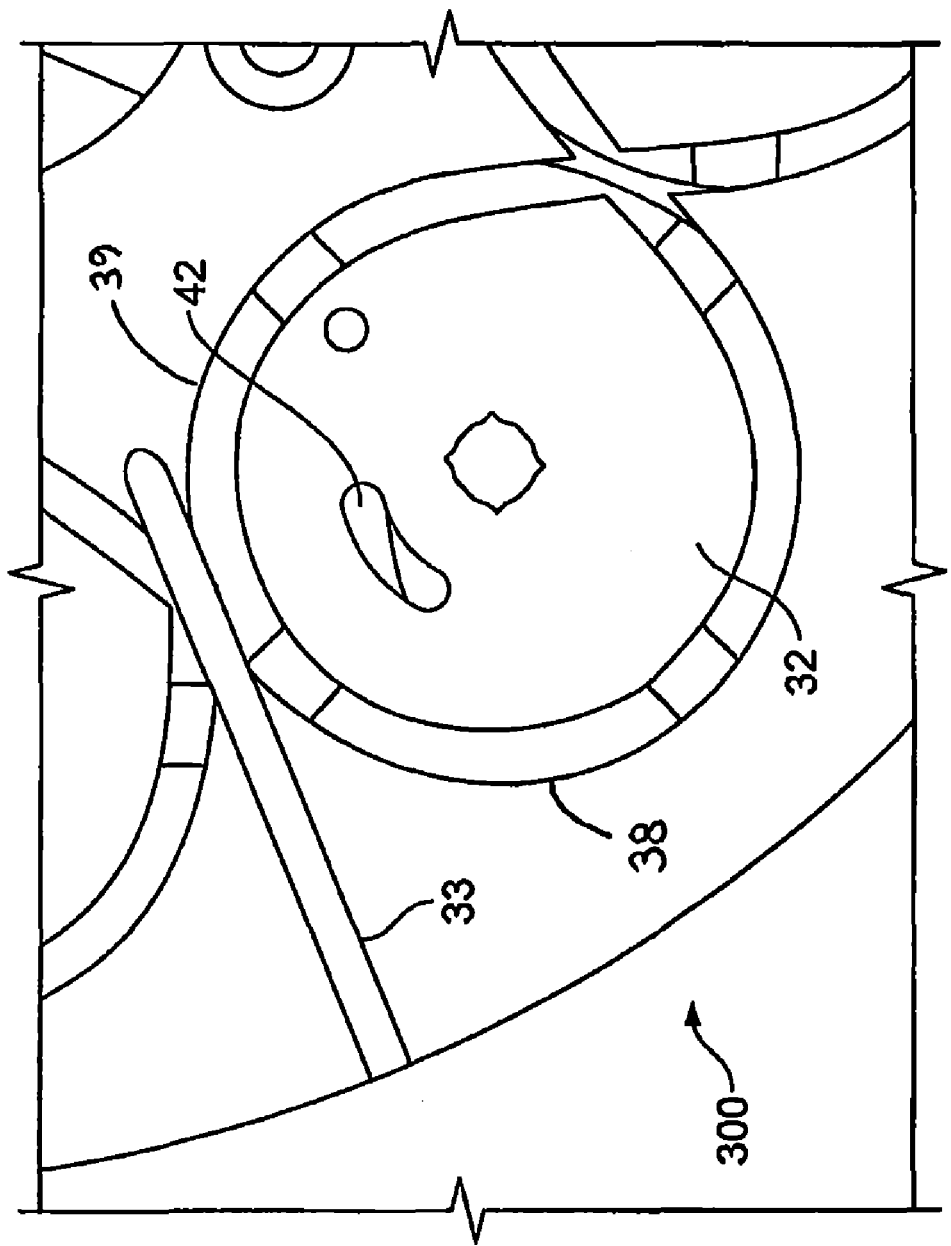
FIG. 15 shows a detail of the braider of FIG. 12, in the flat braiding position.

FIG. 15 detail shows the position of the gate 33 and latch 42. By injecting the gate 33 and retracting the latch 42 into the latch quoit 32 the carriers are forced into the loop tracks 38, 39 creating two separate braids.

Although FIGS. 12-15 do not show an actuator or linkage driving the insertion and retraction of the gates 33, one of ordinary skill can readily adapt any of a variety of mechanical means (e.g., a linear motor(s), air cylinder(s) or the like) to extend and retract the gates 33 to perform switching. A plurality of motors or cylinders may be provided, including one for each gate 33. Alternatively, one or two motors or cylinders may be used, with a linkage elements to cause the gates to move at the same time.

A structure and application of materials is disclosed herein, using braiding technology that can bifurcate from a base construction into more than one braid construction (bifurcation) and recombine at least two bifurcation constructions into one. The apparatus allows the horngear rotation speed and bobbin carrier translation speed to remain constant during tubular braiding, flat braiding and switching between the two modes.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. In a braider having a track for guiding bobbin carriers and horngears, the horngears each having four horns for forming at least two paths, a method comprising the steps of:
   (a) positioning 4N bobbin carriers on 4N horngears, where N is an integer greater than 1, said bobbin carriers and horngears positioned in a tubular braiding mode with the track and horngears configured to provide two paths intersecting each other;
   (b) operating the braider in the tubular braiding mode, to form a tubular braid section;
   (c) positioning the 4N bobbin carriers on the 4N horngears in a flat braiding mode, with the track and horngears configured so that there are N separate closed paths that do not intersect each other;
   (d) operating the braider in the flat braiding mode, to form a flat braid section;
   (e) switching between the tubular braiding mode and flat braiding mode while N of the 4N horngears are free of any contact with any of the 4N bobbin carriers, to form a continuous braid having at least one tubular braid section and at least one flat braid section; and
   (f) maintaining a translation speed of each bobbin carrier substantially constant during steps (b), (d) and (e).

2. The method of claim 1, wherein the step of operating the braider in the flat braiding mode includes forming N flat braids in the flat braid section, each of the N flat braids being continuously connected to the tubular braid section.

3. The method of claim 1, wherein step (e) includes switching a respective pair of track sections on opposite sides of each respective one of the N horngears that are free of any contact with any of the 4N bobbin carriers.

4. The method of claim 1, wherein in the tubular braiding mode:
   there are N carriers on each path, and
   on each path, a number of empty horns between successive pairs of horns having bobbin carriers thereon alternates between two and four.

5. The method of claim 1, wherein in the flat braiding mode, each path has three consecutive horngears, with four bobbin carriers on each path, and two empty horns between successive pairs of horns on each path having bobbin carriers thereon.

6. In a braider having a track for guiding bobbin carriers horngears, the horngears each having four horns for forming at least two paths, a method comprising the steps of:
   positioning 4N bobbin carriers on 4N horngears, where N is an integer greater than one, the bobbin carriers and horngears positioned in a tubular braiding mode with the track and horngears configured to provide two paths intersecting each other, so that there are 2N carriers on each path, and a number of empty horns between successive pairs of horns on each path having bobbin carriers thereon alternates between two and four;

operating the braider in the tubular braiding mode, to form a tubular braid section;

positioning the 4N bobbin carriers on the 4N horngears in a flat braiding mode, with the track and horngears configured so that there are N separate closed paths that do not intersect each other, each path having three consecutive horngears, with four bobbin carriers on each path, and two empty horns between successive pairs of horns on each path having bobbin carriers thereon;

operating the braider in the flat braiding mode, to form a flat braid section; and switching between the tubular braiding mode and flat braiding mode while N of the 4N horngears are free of any contact with any of the 4N bobbin carriers, to form a continuous braid having at least one tubular braid section and at least one flat braid section.

7. The method of claim 6, wherein every fourth horngear is free of contact with any of the 4N bobbin carriers in the flat braiding mode.

8. The method of claim 6, wherein every fourth horngear is excluded from any of the N separate closed paths in the flat braiding mode.

9. The method of claim 8, wherein every fourth horngear is periodically free of contact with any of the 4N bobbin carriers in the tubular braiding mode.

10. The method of claim 9, wherein the switching step includes switching from the tubular braiding mode to the flat braiding mode, when the horngears that are excluded from the separate closed paths while operating in the flat braiding mode are free of contact with any of the 4N bobbin carriers.

11. The method of claim 7, further comprising rotating each of the horngears at a constant speed before, during and after the switching step.

12. The method of claim 6, wherein the switching step includes changing a configuration at every fourth horngear, between a first state in which a first horngear adjacent to each fourth horngear passes bobbin carriers to that fourth horngear, and a second state in which the first horngear adjacent to each fourth horngear does not pass bobbin carriers to that fourth horngear, but instead returns the bobbin carriers to a second horngear adjacent to the first horngear, on the side of the first horngear opposite a side thereof adjacent to the fourth horngear.

13. The method of claim 6, wherein:

each of the bobbin carriers has a foot adapted to travel within one of a pair of slots that are included in the respective intersecting paths; and the switching step includes mechanically switching sections of each slot adjacent to, and on both sides of, every fourth horngear, to divert bobbin carriers away from said fourth horngear for operation in the flat braiding mode.

14. The method of claim 13, wherein the switching step includes moving a linkage to switch each of the sections simultaneously.

15. The method of claim 6, wherein:

the track includes a pair of slots that are included in the respective intersecting paths;

each of the bobbin carriers has a foot adapted to travel within one of the pair of slots; and the switching step includes mechanically switching sections of each slot adjacent to, and on both sides of, every fourth horngear, to receive bobbin carriers from a first horngear on one side of the fourth horngear, and to pass carriers to a second horngear on an opposite side of the fourth horngear, for operation in the tubular braiding mode wherein every said fourth horngear is one of the N of the 4N horngears that are free of any contact with any of the 4N bobbin carriers during the switching step.

16. A braider comprising:

4N horngears, where N is an integer greater than one, the horngears each having four horns capable of being arranged for forming at least two closed paths, 4N bobbin carriers positioned on the 4N horngears, a track capable of being configured in:

a tubular braiding mode, in which there are two intersecting paths with N carriers on each path, and a number of empty horns between successive pairs of horns on each intersecting closed path having bobbin carriers thereon alternates between two and four; and a flat braiding mode in which the 4N bobbin carriers are arranged on the 4N horngears, so that there are N separate closed paths, each path having three consecutive horngears, with four bobbin carriers on each path, and two empty horns between successive pairs of horns on each path having bobbin carriers thereon; and a switch for switching the track between the tubular braiding mode and flat braiding mode while N of the 4N horngears are free of any contact with any of the 4N bobbin carriers, for forming a continuous braid having at least one tubular braid section and at least one flat braid section.

17. The braider of claim 16, further comprising a drive system for rotating each of the horngears at a constant rotational speed before, during and after switching of the switch.

18. The braider of claim 16, wherein the track includes a plurality of bridge sections arranged so that every fourth horngear is positioned adjacent to and between a respective pair of bridge sections, each bridge section switchable by operation of the switch, between a first position in which the track connects every fourth horngear to adjacent horngears on either sides thereof and a second position in which the track reverses direction on each side of every fourth horngear.

19. The braider of claim 18, wherein two or more of the bridge sections are connected by a linkage, so that the two or more bridge sections are switchable between first and second positions by actuation of the linkage.

* * * * *